United States Patent
Davis et al.

(10) Patent No.: US 11,429,114 B2
(45) Date of Patent: Aug. 30, 2022

(54) IMPLEMENT CONTROL OF VEHICLE AND IMPLEMENT COMBINATION

(71) Applicant: Deere & Company, Moline, IL (US)

(72) Inventors: Travis Davis, Moline, IL (US); Darin Packebush, Moline, IL (US)

(73) Assignee: DEERE & COMPANY, Moline, IL (US)

(*) Notice: Subject to any disclaimer, the term of this patent is extended or adjusted under 35 U.S.C. 154(b) by 130 days.

(21) Appl. No.: 16/791,293

(22) Filed: Feb. 14, 2020

(65) Prior Publication Data

US 2021/0255639 A1    Aug. 19, 2021

(51) Int. Cl.
*G05D 1/02* (2020.01)
*A01B 69/00* (2006.01)
*A01B 69/08* (2006.01)

(52) U.S. Cl.
CPC ......... *G05D 1/0278* (2013.01); *A01B 69/001* (2013.01); *A01B 69/004* (2013.01); *A01B 69/006* (2013.01); *G05D 1/0219* (2013.01); *G05D 2201/0201* (2013.01)

(58) Field of Classification Search
CPC .................................................... G05D 1/0278
See application file for complete search history.

(56) References Cited

U.S. PATENT DOCUMENTS

| | | | | |
|---|---|---|---|---|
| 6,052,647 A * | 4/2000 | Parkinson | ............... | G01S 19/55 701/470 |
| 6,434,462 B1 | 8/2002 | Bevly et al. | | |
| 7,127,340 B2 * | 10/2006 | Schick | ................. | A01B 69/008 701/41 |
| 8,190,364 B2 * | 5/2012 | Rekow | ................. | G05D 1/0278 701/466 |
| 8,494,716 B1 * | 7/2013 | Lee | ....................... | G05D 1/0246 701/41 |
| 8,565,984 B2 * | 10/2013 | Mayfield | .............. | A01B 69/008 701/472 |
| 9,089,095 B2 | 7/2015 | Martin et al. | | |

(Continued)

FOREIGN PATENT DOCUMENTS

| | | | | |
|---|---|---|---|---|
| CN | 101833334 A | * | 9/2010 | |
| CN | 101320089 B | * | 9/2011 | .......... B60W 40/105 |

(Continued)

OTHER PUBLICATIONS

John Deere Ag Management Solutions, "Operator's Manual iGuide," OMPFP10808, issue J0 (English), 2009.
Extended European Search Report and Written Opinion issued in European Patent Application No. 21151867.5, dated Jul. 6, 2021, in 9 pages.

*Primary Examiner* — Shelley Chen
(74) *Attorney, Agent, or Firm* — Harness, Dickey & Pierce, P.L.C.

(57) ABSTRACT

An implement includes a global positioning system (GPS) receiver and an implement control system. The global positioning system receiver is configured to obtain position information for the implement. The implement control system is configured to determine a lateral error for the implement based on the position information, estimate a lateral error for a vehicle relative to the implement, the vehicle being attached to the implement, and steer the vehicle to guide the implement based on at least the lateral error for the implement and the lateral error for the vehicle.

17 Claims, 6 Drawing Sheets

(56) References Cited

U.S. PATENT DOCUMENTS

| | | | |
|---|---|---|---|
| 9,227,474 B2 | 1/2016 | Liu | |
| 9,374,939 B2 * | 6/2016 | Pickett | G05D 1/021 |
| 9,880,560 B2 * | 1/2018 | Han | G05D 1/0234 |
| 10,492,360 B2 * | 12/2019 | Connell | A01B 49/06 |
| 10,617,057 B2 * | 4/2020 | Connell | A01C 21/005 |
| 10,645,858 B2 * | 5/2020 | Lawson | B62D 15/025 |
| 10,912,251 B2 * | 2/2021 | Pickett | A01C 21/007 |
| 2006/0041354 A1 * | 2/2006 | Schick | G05D 1/0278 701/472 |
| 2015/0077557 A1 * | 3/2015 | Han | A01B 71/063 348/148 |
| 2015/0291215 A1 * | 10/2015 | Bajpai | B62D 6/00 701/41 |
| 2018/0001928 A1 | 1/2018 | Lavoie et al. | |
| 2018/0061040 A1 | 3/2018 | Beery et al. | |
| 2020/0008340 A1 * | 1/2020 | Stanhope | A01B 76/00 |

FOREIGN PATENT DOCUMENTS

| | | | | |
|---|---|---|---|---|
| CN | 110006419 A | * | 7/2019 | G01C 21/06 |
| CN | 111086510 A | * | 5/2020 | B60W 10/20 |
| CN | 111176284 A | * | 5/2020 | |
| CN | 107153420 B | * | 1/2021 | G05D 1/0276 |
| CN | 109292018 B | * | 1/2021 | B62D 15/00 |
| CN | 112249014 A | * | 1/2021 | B60W 30/12 |
| CN | 112356827 A | * | 2/2021 | |
| CN | 113252365 A | * | 8/2021 | |
| EP | 2141565 A2 | | 1/2010 | |
| JP | 3740787 B2 | * | 2/2006 | |
| TW | 201028311 A | * | 8/2010 | B60W 30/12 |
| WO | WO2020016677 A1 | | 1/2020 | |

* cited by examiner

IMPLEMENT CONTROL OF VEHICLE AND IMPLEMENT COMBINATION

FIELD

One or more example embodiments relate to systems, methods, controllers and/or non-transitory computer-readable storage mediums for implement control of a vehicle and implement combination.

BACKGROUND

In the related art, tractors and implements each include a Global Positioning System (GPS) receiver to guide a tractor and implement combination through a field.

SUMMARY

At least one example embodiment provides an implement comprising a global positioning system receiver and an implement control system. The global positioning system receiver is configured to obtain position information for the implement. The implement control system is configured to: determine a lateral error for the implement based on the position information; estimate a lateral error for a vehicle relative to the implement, the vehicle being attached to the implement; and steer the vehicle to guide the implement based on at least the lateral error for the implement and the lateral error for the vehicle.

According to one or more example embodiments, the implement may further include a perception detection system configured to capture one or more images of an optical target on the vehicle. The implement control system may be configured to estimate the lateral error for the vehicle based on the one or more images of the optical target. The perception detection system may include one or more cameras.

BRIEF DESCRIPTION OF THE DRAWINGS

Example embodiments will be more clearly understood from the following detailed description taken in conjunction with the accompanying drawings.

FIG. 1 is a simplified plan view of a vehicle and implement combination according to one or more example embodiments.

FIG. 2 is a block diagram illustrating electrical systems of a vehicle and implement combination according to one or more example embodiments.

FIG. 3 illustrates an optical target according to one or more example embodiments.

FIG. 4 is a flow chart illustrating a method for controlling a vehicle and implement combination according to one or more example embodiments.

FIG. 5 is a flow chart illustrating a method for controlling a vehicle according to one or more example embodiments.

FIG. 6 is a flow chart illustrating an example embodiment of a method for determining a vehicle-to-implement angle utilizing a marker-based system.

DETAILED DESCRIPTION

Figure 1:
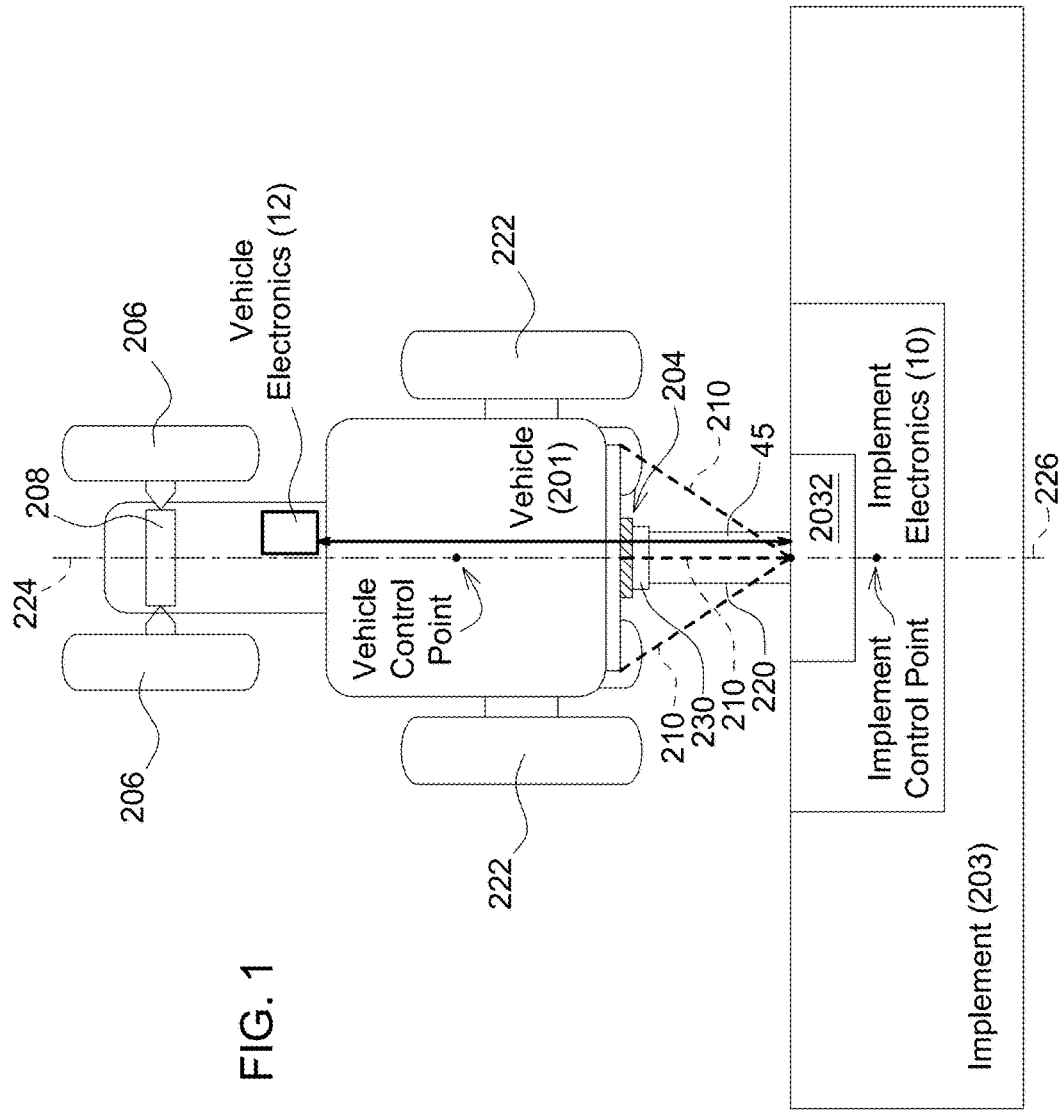
FIGS. 1-6 represent non-limiting, example embodiments as described herein.

Some example embodiments will now be described more fully with reference to the accompanying drawings in which some example embodiments are illustrated.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, for example, those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Such existing hardware may include processing circuitry such as logic circuits; a hardware/software combination such as a processor executing software; or a combination thereof. For example, processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one example embodiment relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

The term memory is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with computer-readable medium.

One or more example embodiments may remove the need for a Global Positioning System (GPS) receiver (or other position/location determining device) on a vehicle and/or remove the need for an actual lateral error of the vehicle, such as a tractor or other agricultural vehicle. Rather than utilizing a GPS receiver on the vehicle, one or more example embodiments provide an implement having a GPS receiver and an implement control system configured to monitor an estimated position (or lateral error or position offset) of the vehicle with respect to the position of the implement. Using a combination of the GPS position of the implement, heading and/or lateral error of the implement, a vehicle-to-implement angle and additional information from the vehicle (such as wheel angle history, yaw rate, etc.), the implement control system may control or steer the vehicle to guide the implement relatively precisely. One or more example embodiments may more easily allow an implement to be built with more precision capability and/or that may be compatible with any vehicle that supports implement position requests (e.g., ISO Class 3 standards or Tractor Implement Management), without the need for a precise GPS receiver on the vehicle.

According to at least one example embodiment, an implement includes a global positioning system receiver and an implement control system. The global positioning system receiver is configured to obtain position information for the implement. The implement control system is configured to: determine a lateral error for the implement based on the position information; estimate a lateral error for a vehicle relative to the implement, the vehicle being attached to the implement; and steer the vehicle to guide the implement based on at least the lateral error for the implement and the lateral error for the vehicle.

The implement may further include a perception detection system configured to capture one or more images of an optical target on the vehicle. The implement control system may be configured to estimate the lateral error for the vehicle based on the one or more images of the optical target. The perception detection system may include one or more cameras.

The implement control system may be configured to: determine a current angle of the vehicle relative to a longitudinal axis of the implement at a control point of the vehicle based on the one or more images of the optical target; estimate a subsequent angle of the vehicle relative to the longitudinal axis of the implement at the control point based on the current angle and steering information associated with the vehicle; and estimate the lateral error for the vehicle relative to the implement based on the subsequent angle of the vehicle and the lateral error for the implement. The steering information associated with the vehicle includes a wheel angle history and a yaw rate for the vehicle.

The implement control system may be configured to: project a desired path for the vehicle based on the lateral error for the vehicle and the position information for the implement; and steer the vehicle based on the desired path for the vehicle.

The implement control system may be configured to steer the vehicle by outputting a request command to a vehicular controller at the vehicle, the request command requesting steering of the vehicle along the desired path.

According to at least one other example embodiment, a method for controlling a vehicle and implement combination includes: obtaining, by a global positioning system receiver at the implement, position information for the implement; determining a lateral error for the implement based on the position information; estimating a lateral error for a vehicle relative to the implement, the vehicle being attached to the implement; and steering the vehicle to guide the implement based on at least the lateral error for the implement and the lateral error for the vehicle.

At least one other example embodiment provides a non-transitory computer-readable storage medium storing computer readable instructions that, when executed by one or more processors at an implement, cause the implement to perform a method for controlling a vehicle and implement combination, the method comprising: obtaining, by a global positioning system receiver at the implement, position information for the implement; determining a lateral error for the implement based on the position information; estimating a lateral error for a vehicle relative to the implement, the vehicle being attached to the implement; and steering the vehicle to guide the implement based on at least the lateral error for the implement and the lateral error for the vehicle.

The method may further comprise capturing one or more images of an optical target on the vehicle; and wherein the estimating estimates the lateral error for the vehicle based on the one or more images of the optical target.

The estimating may further comprise: determining a current angle of the vehicle relative to a longitudinal axis of the implement at a control point of the vehicle based on the one or more images of the optical target; estimating a subsequent angle of the vehicle relative to the longitudinal axis of the implement at the control point based on the current angle and steering information associated with the vehicle; and estimating the lateral error for the vehicle relative to the implement based on the subsequent angle of the vehicle and the lateral error for the implement.

The steering information associated with the vehicle may include a wheel angle history and a yaw rate for the vehicle.

The method may further include projecting a desired path for the vehicle based on the lateral error for the vehicle and the position information for the implement; and wherein the steering steers the vehicle based on the desired path for the vehicle.

The method may further include outputting a request command to a vehicular controller at the vehicle, the request command requesting steering of the vehicle along the desired path.

FIG. 1 is a simplified plan view of a vehicle and implement combination according to one or more example embodiments.

Referring to FIG. 1, a vehicle 201 (e.g., a tractor or other agricultural vehicle) has a set of rear wheels 222 and a set of steerable vehicle wheels 206 (e.g., front wheels). A vehicle actuator (e.g., electrohydraulic member or vehicle steering actuator) (not shown) may steer or adjust the target vehicle steering angle of the steerable vehicle wheels 206 via a vehicle steering linkage 208. Although the vehicle 201 illustrates that the steerable vehicle wheels 206 are front wheels, in other example embodiments the steerable vehicle wheels may comprise other steerable wheels or steerable rear wheels. Further, other configurations are possible such as a single steerable front wheel or rear tracks instead of the rear wheels 222.

The vehicle 201 further includes an optical target 204 and vehicle electronics 12 for controlling the vehicle 201. In this example, the optical target 204 is (e.g., mechanically) arranged or coupled to the rear of the vehicle 201 such that the optical target 204 faces the implement 203, and more specifically, faces an image capture device 2032 included in the implement 203. The vehicle electronics 12 and the optical target 204 will be discussed in more detail later with regard to FIGS. 2-6.

The direction of travel or heading of the vehicle 201 may be defined with reference to the vehicle longitudinal axis 224 of the vehicle 201.

Each of the vehicle 201 and the implement 203 have a respective control point. A control point is the position used to determine the lateral and heading error from zero. In at least one example embodiment, the control point may be the center point of rotation for the vehicle. In the example shown in FIG. 1, for example, the control point may be the center point on the axis between the rear wheels 222. According to other example embodiments, the control point may be a point relatively close to the center of vehicle.

Still referring to FIG. 1, the vehicle 201 is connected to an implement 203 at a pivot point 230 via a hitch and drawbar 220.

The direction of travel or heading of the implement 203 may be defined with reference to the implement longitudinal axis 226 of the implement 203.

In the example embodiment shown in FIG. 1, the implement longitudinal axis 226 may be aligned with the vehicle longitudinal axis 224 when the implement 203 and the vehicle 201 are traveling in the same direction.

The implement 203 may include an implement actuator, such as electrohydraulic member (not shown), to steer or adjust the target implement steering angle of two or more steerable implement wheels (not shown) via implement steering linkage or another mechanical assembly (not shown). In at least one example embodiment, the implement 203 may include a sprayer for spraying chemicals, solutions, insecticides, herbicides, fungicides, fertilizer, nitrogen, potash, phosphorus, minerals, nutrients, soil treatments, or other crop inputs. In other example embodiments, the implement 203 may include a ground-engaging portion, such as coulters, discs, harrows, tines, knives, cutting tool, a digger, a plate, a planting member, or another device for plowing, planting, cultivating, cutting, or providing an agronomic function.

Depending upon the particular configuration, the implement 203 may have optional crop processing machinery, ground engaging machinery, or other structural components (not shown) for agricultural, construction, forestry, industrial or other work tasks.

The implement 203 includes implement electronics 10. As will be discussed in more detail later with regard to FIG. 2, the implement electronics 10 may include, among other things, the image capture device 2032.

In some examples, the image capture device 2032 may be a camera, such as an IDS gigE UEye Re camera (UI-5490RE) with Computaar 8 mm 1:1.4 ⅔ lens. However, any appropriate camera/lens combination may be used. For example purposes, an example embodiment in which the image capture device 2032 is a camera will be discussed. It should be understood, however, that example embodiments should not be limited to the examples discussed herein.

The image capture device 2032 defines a corresponding field of view, as generally indicated by lines 210 in FIG. 1. In the example embodiment shown in FIG. 1, the image capture device 2032 has an angular viewing range of approximately 90 degrees. However, any appropriate angular viewing range may be used based on a specific application.

An imaging system, such as the image capture device 2032 (e.g., a stereo camera or monocular vision) may have an image coordinate system that differs from the real-world coordinates. Such an imaging system may utilize a vector offset (e.g., with or without rotation) and/or scaling to compensate for lens distortion or other limitations of the imaging system.

Figure 2:
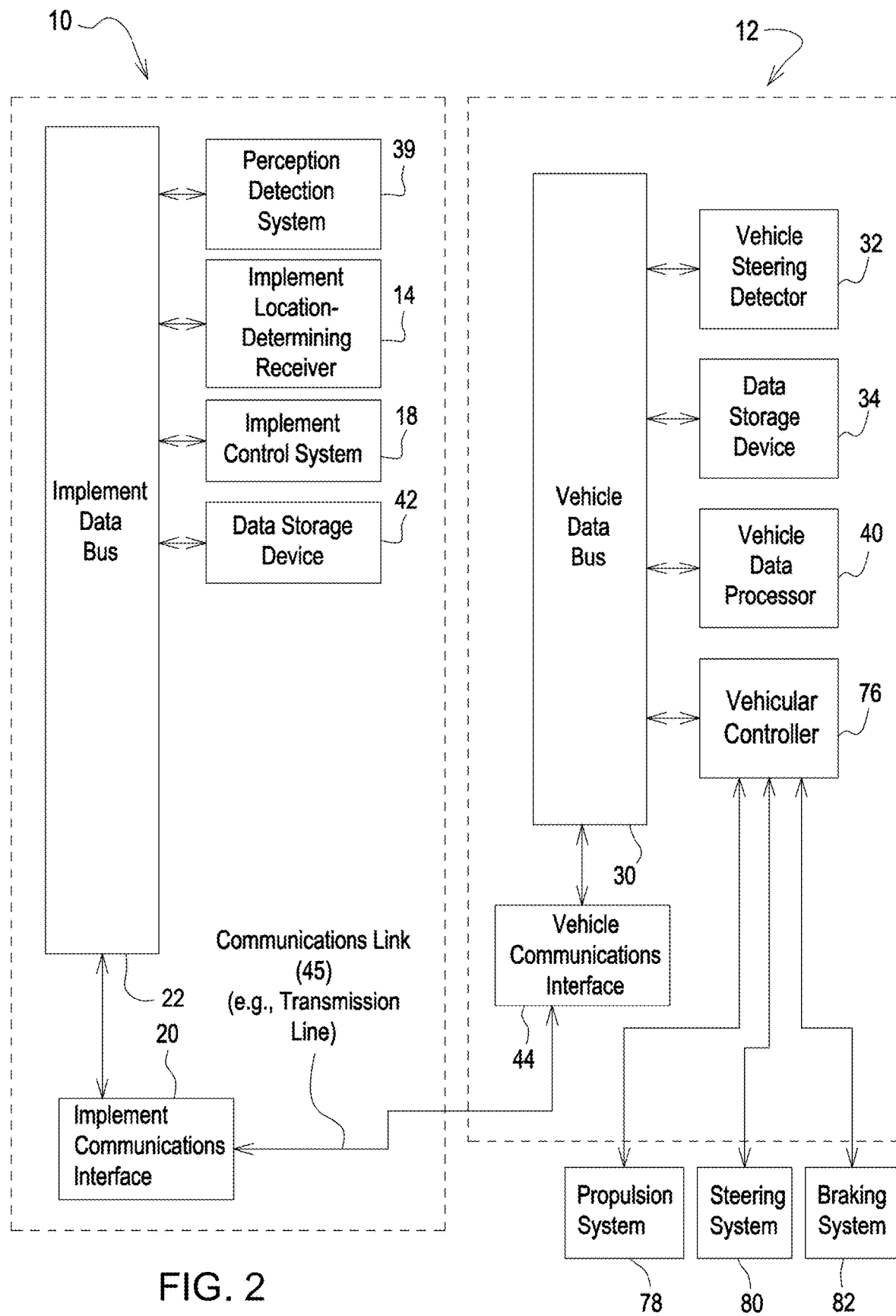

FIG. 2 is a block diagram illustrating electrical systems of the vehicle 201 and the implement 203, according to one or more example embodiments. The electrical systems include implement electronics 10 and vehicle electronics 12, which are communicatively coupled by a communications link 45.

Referring to FIG. 2, the vehicle electronics 12 include a vehicle communications interface 44 and the implement electronics 10 include an implement communications interface 20. The implement communications interface 20 is operably coupled to other elements of the implement electronics via the implement data bus 22, and to the vehicle communications interface 44 via the communications link 45. The vehicle communications interface 44 is also operably coupled to other elements of the vehicle electronics 12 via the vehicle data bus 30.

The vehicle communications interface 44 may include one or more of an input/output data port, a communications port, a transmitter, a receiver, a wireline transceiver, or a wireless transceiver. In at least one example embodiment, the vehicle communications interface 44 may include a buffer memory for storing data that is received from the vehicle data bus 30 or another data source, or transmitted to the vehicle data bus 30, or to another data recipient. The input/output data port may include a transceiver, such as a universal asynchronous receiver/transmitter.

The communications link 45 between the vehicle electronics 12 and the implement electronics 10 may include one or more of a transmission line, a cable, a wire, a paired transmitter and receiver for transmission of electromagnetic signals (e.g., radio frequency, optical, microwave, etc.), or a set of wireless transceivers for communication of electromagnetic signals.

The vehicle electronics 12 further include a vehicle steering detector 32 (also sometimes referred to as a vehicle steering sensor), a data storage device 34, a vehicle data processor 40, and a vehicular controller 76 communicatively coupled with one another and the vehicle communications interface 44 via the vehicle data bus 30. As mentioned similarly above, according to one or more example embodiments, the vehicle electronics 12 (and the vehicle 201) need not include a position determination system, such as a GPS receiver or the like. As such, a position determination system, such as a GPS receiver, may be omitted from the vehicle 201 and included (e.g., only) on the implement 203.

The vehicle steering detector 32 detects the angle of a steered wheel (wheel angle) of the vehicle 201. The vehicle steering detector 32 may store (e.g., periodically or continuously) the steered wheel angle of the vehicle 201 in the data storage device 34 and/or output the steered wheel angles to the implement electronics 10 via the vehicle data bus 30 and the communications link 45. The stored values for steered wheel angle may be referred to as a wheel angle history or history of wheel angles.

The data storage device 34 may include an electronic memory such as that discussed above. The data storage device 34 may store data (e.g., digital data) such as the steered wheel angles (wheel angle history), yaw rate, vehicle heading information, vehicle speed, or the like.

The vehicle data processor 40 may include processing circuitry such as that discussed above. The vehicle data processor 40 may control the vehicle 201 (e.g., steering, braking, throttle, or the like) by outputting corresponding signals to, for example, the vehicular controller 76

The vehicular controller 76 may control and interface with a propulsion system 78, a steering system 80 and a braking system 82 of the vehicle 201. The vehicular controller 76 may convert or issue steering (curvature) commands (e.g., steering angle commands) or signals, braking commands or signals, throttle commands to an engine, or control signals to an electric motor based on corresponding signals from the vehicle data processor 40 and/or the implement electronics 10 as discussed in more detail later.

Still referring to FIG. 2, the implement electronics 10 include a perception detection system 39, an implement location-determining receiver 14, an implement control system 18, a data storage device 42 and the implement communications interface 20 communicatively coupled with one another via the implement data bus 22. The perception detection system 39 may include the image capture device 2032 and the optical target 204. Although part of the perception detection system 39, as discussed above, the optical target 204 is arranged on the vehicle 201.

The implement location-determining receiver 14 may be, or include, a GPS receiver, a GPS receiver with differential correction, or another receiver for receiving location data from satellite or terrestrial reference transmitters. The implement location-determining receiver 14 is mounted on the implement 203 and determines a position of the implement location-determining receiver 14 based on the received location data. The implement location-determining receiver

14 may provide vehicle position data coordinates and/or heading data for the implement 203. The position data may be expressed in coordinates (e.g., longitude and latitude). The heading may be expressed as an angular bearing with reference to the magnetic or geographic North pole or another reference, for example.

A location-determining receiver, such as a GPS receiver, may provide real world coordinates (e.g., in 2 or 3 dimensions), velocity, position and heading data of the implement 203. Accelerometers or gyroscope on the location-determining receiver may also provide tilt, roll and yaw angles as the implement 203 moves through the field. For example, the location-determining receiver may operate in a precise point positioning (PPP) mode or in a precise real-time kinematic (RTK) mode. In the RTK mode, coordinate estimates of the implement 203 may be based on correction data or differential correction data from one or more local (e.g. nearby 0-25 Km) location-determining (e.g., satellite) navigation reference stations (e.g., typically stationary satellite navigation receivers at known fixed locations) with a wireless link to the mobile location-determining receiver on the implement 203. In the PPP mode, a network of reference stations may have a central processing hub that estimates correction data that is provided to the mobile satellite navigation receiver on the implement 203 via a wireless link. Satellite reception of the location-determining receiver or the wireless link (feeding the correction data) may be interrupted or subject to fading or signal strength/reliability issues, such that the optical patterns may be used to augment to the guidance and position, velocity and heading information of the tractor 201 relative to the implement 203 with the optical patterns on it. For a vehicle in close proximity to the implement, the separation or shortest vector, mean vector, or average vector between the estimated location-determining (e.g., satellite navigation-based) vector and the estimated optical-based vector (e.g., between 2D or 3D reference points on vehicle and implement) may be used for guidance or position estimates for any sampling interval.

The implement control system 18 may include an implement steering controller (not shown), which may be coupled to an implement steering system (not shown). The implement control system 18 controls operation of the implement 203 and may also control at least the steering of the vehicle 201. More detailed discussion of example functionality of the implement control system 18 will be discussed later with regard to FIGS. 4 and 6.

As mentioned above, the perception detection system 39 includes the image capture device 2032 and the optical target 204. The optical target 204 is arranged on the vehicle 201, whereas the image capture device 2032 is arranged on the implement 203. Referring back to the example embodiment shown in FIG. 1, the optical target 204 and the image capture device 2032 may be positioned such that the elements are aligned with one another along the longitudinal axis 226 of the implement 203 and the longitudinal axis 224 of the vehicle 201.

In one example, the image capture device 2032 obtains continuous or periodic images of the optical target 204, and outputs the obtained image data to the implement control system 18. As discussed in more detail later with regard to FIG. 6, the implement control system 18 may determine a vehicle to implement angle (e.g., a displacement and/or rotation) for the vehicle 201 by monitoring and/or visually/optically measuring the optical target 204.

Figure 3:
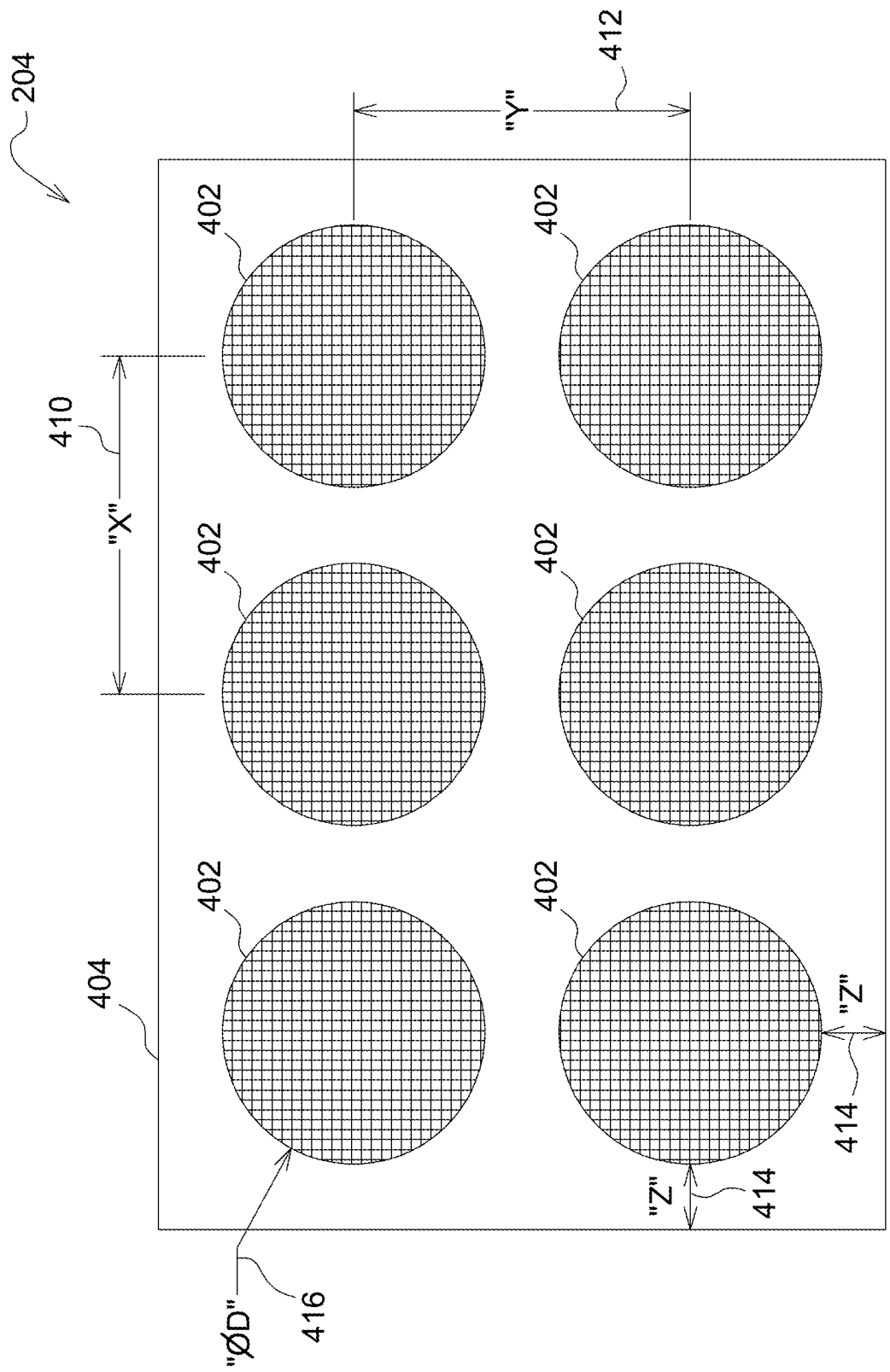

FIG. 3 is a more detailed illustration of an example embodiment of the optical target 204.

Referring to FIG. 3, the optical target 204 includes an array of circular targets 402 and is defined by a generally rectangular border 404. In this example, two rows of the three circular targets 402 are included, and the circular targets 402 have a relatively dark color (e.g., black) while a background surrounding the circular targets 402 has a relatively light color (e.g., white, gray, off-white, etc.) to provide a significant contrast that can be easily detected by a camera in dusty and/or obscured conditions.

In one example, the circular targets 402 may be flat-bed printed onto a magnetic sheet that is then affixed to a steel plate. In turn, the steel plate may be attached to the vehicle 201 by heavy-capacity magnets at four points.

In the example shown in FIG. 3, the optical target 204 may be approximately 15 inches (") wide by 10" tall. Dimensions 410 and 412, which are denoted by "X" and "Y," respectively, may be approximately 4.75" while dimensions 414, denoted by "Z," may be approximately 1". Further, diameter 416, which is denoted by "φD," may be approximately 3.5". The dimensions described in this example are only examples and any appropriate dimensions and/or size ratios may be used according to application, component size(s), visibility, etc.

The center point or axes of each circular target 402 may be assigned a three-dimensional position that may be used as a reference point. Similarly, the aggregate center point or axes of the entire pattern (e.g., multiple circular targets 402) shown in FIG. 3 may be used as a center point a three-dimensional reference position.

While a total of six circular targets 402 are shown in FIG. 3, any appropriate number or arrangement of the circular targets 402 may be used. While the circular targets 402 are shown with a darker color in FIG. 3, in some examples, the background may be a darker color than the circular targets 402 (e.g., a black background with white or gray circular targets 402, etc.). In other examples, the circular targets may not have a significantly different color from the background, and a line segment may define each of the circular targets 402.

While the circular targets 402 are round and/or ellipsoid in the example shown in FIG. 3, the circular targets 402 may be any appropriate shape (e.g., a triangular shape, a square shape, a pentagon shape or any appropriate polygon shape).

In some examples, the array of circular targets 402 may be directly provided and/or printed onto the vehicle 201. Alternatively, the optical target 204 may be engraved onto the vehicle 201. In some examples, the optical target 204 may be disposed on (e.g., directly printed on) a contour (e.g., a non-flat surface) of the vehicle 201.

Although example embodiments are discussed herein with regard to a marker-based system utilizing the optical target 204, it should be understood that other systems may be used. For example, one or more example embodiments may utilize 3-D reconstruction (e.g., stereo disparity, lidar, laser, etc.) of the main portion of the vehicle 201 relative to the implement 203, a vision system examining the drawbar 220 to measure the vehicle-to-implement angle (or change in angle) between the vehicle 201 and the implement 203 based on pixel shift and/or a marker-based system such as that discussed herein that is extended to include April Tags or other QR code type indicators to assist with tracking the vehicle 201. In one example, details may be added to a QR code to provide the implement electronics 10 with vehicle dimensions, turn radius, model number, dynamic information such as wheel angle speed characteristics at different angles, or the like, about the vehicle 201. In this case, the perception detection system 39 may function as a QR code reader.

According to one or more example embodiments, the implement control system 18 may estimate the position of the vehicle 201 based on a heading error for the vehicle 201 and an estimate of the lateral error for the vehicle 201, wherein the lateral error for the vehicle 201 is estimated based on one or more images (image data) obtained by the image capture device 2032. The implement control system 18 may monitor the lateral error (or estimated position) of the vehicle 201 and control steering of the vehicle 201 at least partly based on, for example, the lateral error (or estimated position) of the vehicle 201.

Figure 4:
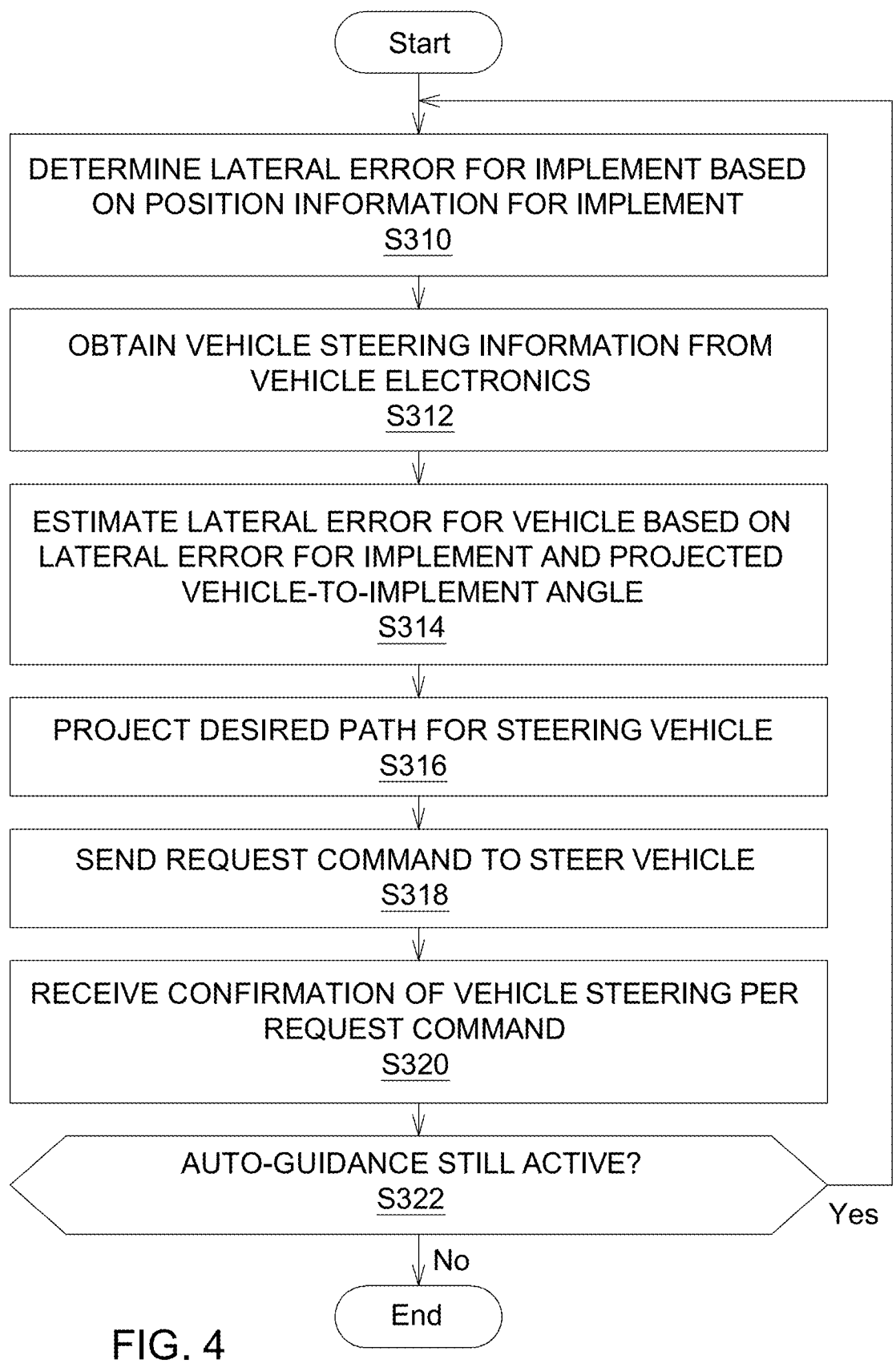

FIG. 4 is a flow chart illustrating a method for controlling a vehicle and implement combination according to one or more example embodiments. The method shown in FIG. 4 may be performed by the implement electronics 10 shown in FIGS. 1 and 2. However, example embodiments should not be limited to this example.

As mentioned similarly above, according to one or more example embodiments, using a combination of the GPS position of the implement 203, the heading error for the vehicle 201 and the lateral error of the vehicle 201, which may be determined based on image data from the image capture device 2032 and additional information from the vehicle 201 (such as wheel angle and/or yaw rate history), the implement control system 18 may control and/or guide the vehicle 201 relatively precisely using the feed forward view of the vehicle's impact to properly impact the position of the implement 203.

Referring to FIG. 4, at step S310 the implement control system 18 determines a current lateral error for the implement 203 based on geographical location (or position) information for the implement 203 obtained by the implement location-determining receiver 14. Because methods for determining lateral error based on geographical position information are generally known, further discussion is omitted.

As mentioned above, the implement location-determining receiver 14 may be a GPS receiver, which determines the location (or position) of the implement 203 based on GPS signals. In this example, the geographical location information may include implement position data coordinates and heading data for the implement 203. As also mentioned earlier, the position data may be expressed in coordinates (e.g., longitude and latitude). The heading data may be expressed as an angular bearing with reference to the magnetic or geographic North pole or another reference, for example.

The implement location-determining receiver 14 may output the geographical location information for the implement 203 to the implement control system 18 via the implement data bus 22. Alternatively, the implement location-determining receiver 14 may output the geographical location information for the implement 203 to the data storage device 42 to be stored. In this case, the implement control system 18 may retrieve the geographical location information from the data storage device 42 as needed to determine lateral error for the implement 203.

At step S312, the implement control system 18 obtains vehicle steering information from the vehicle electronics 12. According to at least one example embodiment, the vehicle steering information may include wheel angle data and/or yaw rate data from the vehicle steering detector 32. According to at least one example embodiment, the wheel angle data may include wheel angle history and yaw rate data may include a yaw rate history for the vehicle 201.

At step S314, the implement control system 18 estimates the current position offset or lateral error of the vehicle 201 (also sometimes referred to herein as position offset information or relative error information), which may be indicative of the position of (or position information for) the vehicle 201. In one example, the estimated position of (position information for) the vehicle 201 may be in the form of a lateral and heading error for the vehicle 201 relative to the implement 203. As discussed in more detail below, the implement control system 18 may estimate the lateral of the vehicle 201 based on the lateral error of the implement 203 and a projected vehicle-to-implement angle at the control point. The projected vehicle-to-implement angle is an estimate of a future (or subsequent, later) angle of the vehicle 201 relative to the longitudinal axis of the implement 203 at the control point.

The implement control system 18 may determine the projected vehicle-to-implement angle based on the vehicle steering information obtained at step S312 and a vehicle-to-implement angle between the vehicle 201 and the implement 203. The vehicle-to-implement angle may be determined based on (e.g., most recent) images (or image frames) of the optical target 204 obtained by the image capture device 2032, which may be taken in real-time or stored in the data storage device 42. The projected vehicle-to-implement angle may also be based on the QR code or April Tag information.

In a more specific example, according to at least one example embodiment, the implement control system 18 may compute the estimated lateral error Est_Veh_Lat_Err for the vehicle 201 relative to the implement 203 as the difference between the current implement lateral error Imp_Lat_Err for the implement 203 (determined at step S310) and the projected vehicle-to-implement angle Proj_Veh_to_Imp_Angle between the vehicle 201 and the implement 203 at the control point, as shown below in Equation 1.

$$\text{Est\_Veh\_Lat\_Err} = \text{Imp\_Lat\_Err} - \text{Proj\_Veh\_to\_Imp\_Angle} \quad (1)$$

In this example, the implement control system 18 may compute the projected vehicle-to-implement angle Proj_Veh_to_Imp_Angle based on a history of the wheel angles relative to the yaw rate for the vehicle 201 and a vehicle-to-implement angle as determined based on image data obtained by the perception detection system 39. The vehicle-to-implement angle is the determined angle of the vehicle 201 relative to the longitudinal axis of the implement 203 at the control point. In one example, the implement control system 18 may compute the projected vehicle-to-implement angle Proj_Veh_to_Imp_Angle according to Equation 2 as shown below.

$$\text{Proj\_Veh\_to\_Imp\_Angle} = \frac{\text{History of Wheel Angles}}{\text{Vehicle Yaw Rate}} * \text{Veh\_to\_Imp\_Angle} \quad (2)$$

The history of wheel angles may be mapped (or converted into a mapping of prior wheel angles) of the vehicle 201 (e.g., wheel angles stored every 1 ms for the last 3-5 seconds), which may be used to project the direction the vehicle 201 is heading (projected error). In another example, the history of wheel angles may be an averaging, or other filtering mechanism, applied to the past wheel angles.

As mentioned above, both the past wheel angles and the vehicle yaw rate may be stored in the data storage device 42 or the data storage device 34 and retrieved by the implement control system 18 as needed.

Figure 6:
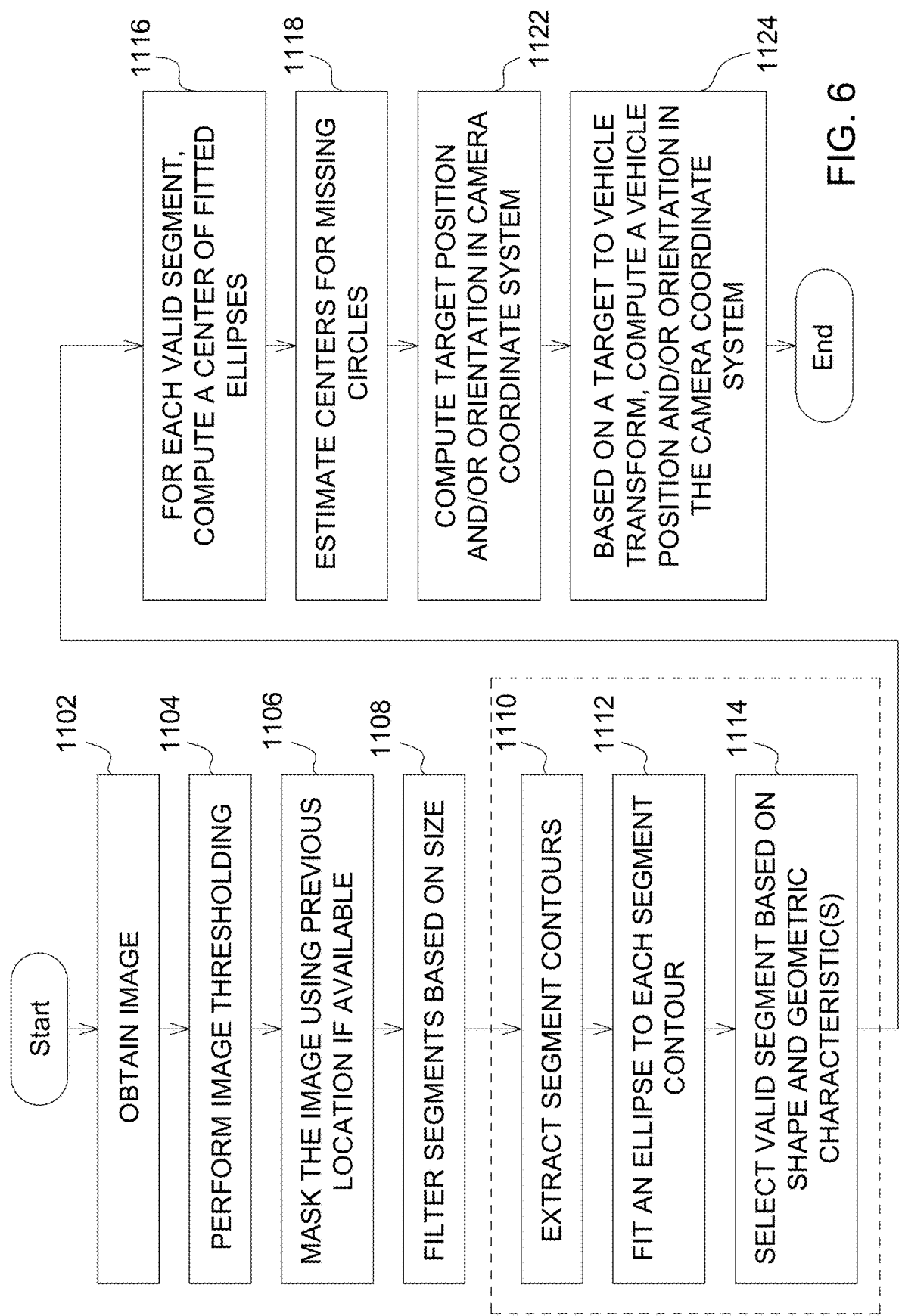

FIG. 6 is a flow chart illustrating an example embodiment of a method for determining a vehicle-to-implement angle utilizing a marker-based system such as the perception detection system 39 and the optical target 204. For example purposes, the method shown in FIG. 6 will be discussed with regard to the vehicle and implement combination shown in FIG. 1, and the electrical systems shown in FIG. 2.

Referring to FIG. 6, at step 1102, the camera 2032 obtains an image of the optical target 204. The camera 2032 outputs the obtained image to the implement control system 18.

At step 1104, the implement control system 18 performs image thresholding by verifying that the image meets a threshold level of clarity and/or definition. In one example, the implement control system 18 may verify that the image (e.g., a binary image) meets a threshold level of clarity or definition if segments of the image have an appropriate intensity level (e.g., circles of a circular pattern exceed a threshold intensity level). Additionally or alternatively, the implement control system 18 may verify that all expected patterns are present in the captured image.

At step 1106 the implement control system 18 masks the image using a previous location (e.g., if the previous location is available). In particular, for example, the implement control system 18 may mask and/or disregard portions of the image based on the previous position/location of the optical target 204 (e.g., based on previously calculated positions of the optical target 204). As a result, a reduced number of pixels of the captured image may be used in this analysis, which may improve the computational efficiency required to analyze the optical target 204.

At step 1108, the implement control system 18 filters segments of the image based on size. In more detail, for example, objects (e.g., identified objects) of the captured image that are not within a size threshold range (e.g., objects that are larger or smaller than a defined threshold range) are filtered and/or associated portions of the captured image are ignored by the implement control system 18.

At step 1110, the implement control system 18 extracts segment contours from the captured image. With regard to the example optical target 204 shown in FIG. 3, the implement control system 18 may determine/calculate segment contours of the example circular targets 402 by analyzing the captured image.

At step 1112, the implement control system 18 fits an ellipse to each segment contour. In more detail with regard to the example shown in FIG. 3, the implement control system 18 may fit each of the example circular targets 402 with a corresponding ellipse (e.g., a mathematical expression representing the corresponding ellipse is generated based on the captured image).

At step 1114, the implement control system 18 selects valid segment(s) based on shape and geometric characteristics. For example, the implement control system 18 may analyze the circular targets 402 of the optical target 204 to determine whether the targets 402 exhibit an appropriate "roundness" and/or circularity.

At step 1116, the implement control system 18 computes centers of respective fitted ellipses for each valid segment. In this example, the implement control system 18 may calculate/determine centers of the fitted ellipses using a calculated area center based on their respective shapes, as represented by the captured image.

In more detail, according to at least one example embodiment, the implement control system 18 locates the fiducial centers of the respective fitted ellipses in the image. In some examples, the image is undistorted based on the previously established camera calibration. The undistorted image may be made binary with a Sauvola-based adaptive threshold based on pixel blocks. In some examples, size(s) of the blocks may be specified in a parameter file. Binary objects smaller or larger than a threshold size range (e.g., an expected threshold size range) may be removed and the image may be inverted to remove holes in objects that are below a given threshold. In this example, the implement control system 18 computes contours of the remaining objects (after the binary objects are removed), and fits, for each contour, an ellipse to contour data points based on a least-squared solution, for example. The implement control system 18 then filters the contours by a set of parameters including, but not limited to, contour area, contour length, a difference between a major and a minor axis of the fit ellipse, a difference between an ellipse area and a contour area, and/or circularity of the contour. In some examples, if certain conditions are met, the implement control system 18 computes a center based on an average of the ellipse center and/or a center of mass/area/volume of the object. The implement control system 18 may store this center as one of the six fiducial centers, for example.

At step 1118, the implement control system 18 estimates centers for missing circles. For example, the implement control system 18 may calculate centers of a visible portion (e.g., one, two or three, etc.) of the six circular targets 402 based on the captured image while extrapolating/calculating a remaining portion (e.g., not visible portion) of the circular targets 402 based on the calculated centers (e.g., geometric centers) of the visible portion of the circular targets 402.

According to at least some example embodiments, the implement control system 18 may compute confidence metrics for the estimates centers of the circular targets 402. In more detail, for example, the implement control system 18 may compute a confidence index based on determine confidence metrics of each of the circular targets 402.

According to one or more example embodiments, the confidence index/metrics may reflect a quality of the detection and tracking of the target by the camera 2032, segmentation, quality of shapes of the optical target 204, a check that the optical target 204 has a proper number of shapes (e.g., six circles of a shape array), verification of a geometrical relationship in space and/or tracking in a previous frame (image) to verify a difference between measured and predicted shape locations of the current frame (image) does not exceed a threshold (e.g., a frame-to-frame shape differential threshold).

At step 1122, the implement control system 18 computes a target position and orientation of the vehicle 201 in a camera coordinate system for the camera 2032. With regard to the example optical target 204 shown in FIG. 3, the implement control system 18 utilizes the calculated centers of each of the six circular targets 402 to determine a position and/or rotation of the optical target 204. In turn, the implement control system 18 extrapolates a rotational displacement or angle (e.g., in multiple degrees of freedom) for the vehicle 201 using the position and/or rotation of the optical target 204.

At step 1124, the implement control system 18 computes the estimated position and orientation of the vehicle 201 in the camera coordinate system using a transformation (e.g., a transformation matrix) between a target and the vehicle 201. The implement control system 18 then converts the calculated target position and orientation in the camera coordinate system to the vehicle-to-implement angle Veh_to_Imp_Angle in the coordinate system of the vehicle 201. Additionally or alternatively, the implement control system 18 may convert/transform the calculated target position and orientation into a global coordinate system (e.g., a GPS/global coordinate system) or a work site coordinate system (e.g., a local coordinate system).

As an alternative to the example embodiment shown in FIG. 6, the implement control system 18 may determine the vehicle-to-implement angle Veh_to_Imp_Angle using a stereo disparity method. In one example, the implement control system 18 may generate a depth map from an image captured by the camera 2032. The implement control system 18 may then determine the vehicle-to-implement angle Veh_to_Imp_Angle based on the depth map.

In yet another alternative, the implement control system 18 may determine the vehicle-to-implement angle Veh_to_Imp_Angle using a feature detection and analysis method. In this example, the camera 2032 may be mounted above the drawbar 220 shown in FIG. 1.

The implement control system 18 may utilize a lookup table to determine an angle shift of the drawbar 220 based on a determined pixel shift of the drawbar 220 in images of the drawbar 220 obtained by the camera 2032. In one example, the implement detection system 220 may use image feature detection to determine the edges of the drawbar 220 in a captured image, and then compare positions of pixels of the drawbar 220 in the captured image with positions of pixels of the drawbar 220 in a reference image (e.g., when the implement 203 and the vehicle 201 are traveling straight in line one behind the other) to determine the pixel shift. The implement control system 18 may also take into account mounting position of the camera 2032, the camera lens, or the like, in determining the vehicle-to-implement angle Veh_to_Imp_Angle.

Returning to FIG. 3, at step S316, the implement control system 18 computes or projects a desired path for steering the vehicle 201 based on the vehicle steering information from the vehicle steering detector 32, the lateral error for the implement 203, the heading error for the vehicle 201 and the estimated lateral error of the vehicle 201 calculated at step S314. In one example, the implement control system 18 projects the desired path for steering the vehicle 201 by generating a curvature command for the vehicle 201 based on the vehicle steering information, the lateral error for the implement 203, the heading error for the vehicle 201 and the estimated lateral error for the vehicle 201. Because methods for projecting desired steering paths, including generating curvature commands, are generally known, further discussion is omitted.

At step S318, the implement control system 18 sends a request command (e.g., curvature command) to the vehicular controller 76 to request that the vehicle 201 be steered along the desired vehicle path determined at step S316. Because request commands such as these are generally known, further discussion is omitted.

At step S320, the implement control system 18 receives a confirmation message indicating that the vehicle 201 has been steered according to the request command sent at step S318. The vehicular controller 76 may output the confirmation message to the implement control system 18 after having steered the vehicle 201 in accordance with the desired path indicated in the request command. Because confirmation messages such as these are generally known, further discussion is omitted.

After receiving the confirmation message, at step S322, the implement control system 18 determines whether the auto-guidance system enabling the implement 203 to control the steering of the vehicle 201 is still active. Unless the auto-guidance system is no longer active (deactivated), the process returns to step S310 and continues as discussed herein.

Returning to step S322, if the implement control system 18 determines that the auto-guidance system is no longer active, then the process terminates.

In at least some example embodiments, once enabled (e.g., by a user via a user interface at the vehicle 201), the auto-guidance system may remain active until has been deactivated (e.g., by a user via the user interface at the vehicle 201) or until a system fault condition (e.g., a hardware fault) is detected at the implement control system 18. In one example, a system fault condition may occur if a command request is not fulfilled within a threshold period of time after being requested (e.g., a timeout occurs).

Figure 5:
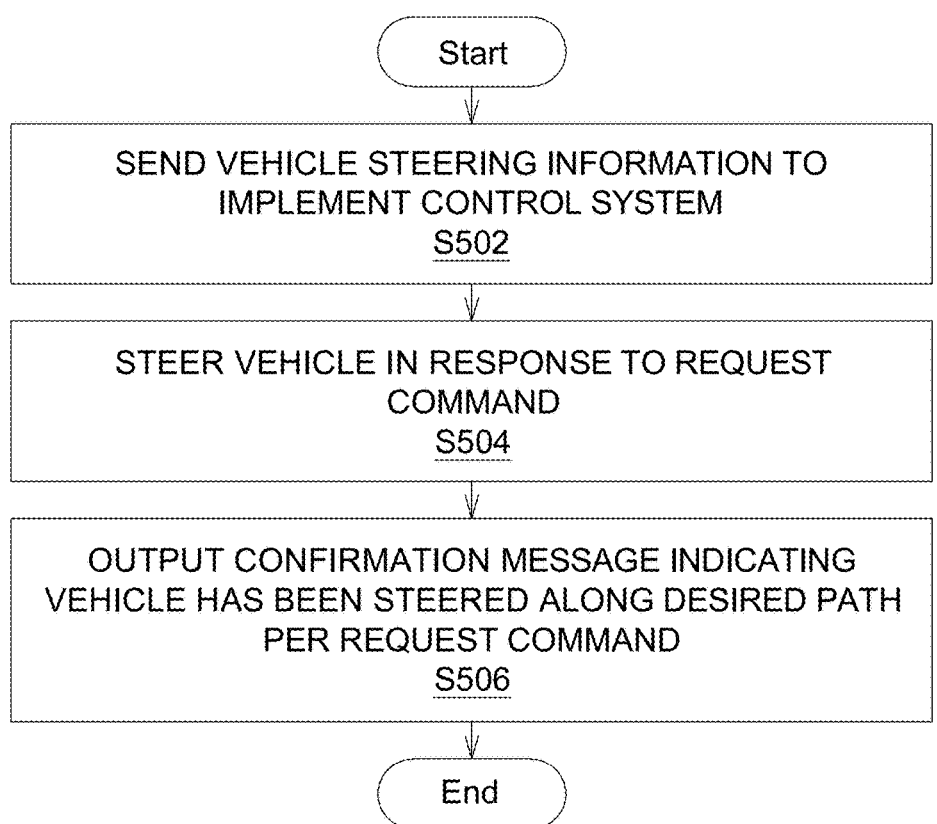

FIG. 5 is a flow chart illustrating a method for controlling a vehicle according to one or more example embodiments. For example purposes, the example embodiment shown in FIG. 5 will be discussed with regard to the vehicle and implement combination and associated electrical systems shown in FIGS. 1-2.

Referring to FIG. 5, at step S502 the vehicle electronics 12 sends vehicle steering information to the implement control system 18 via the vehicle data bus 30, the communications link 45 and the implement data bus 22.

At step S504, the vehicular controller 76 receives a request command from the implement control system 18, wherein the request command requests that the vehicular controller 76 steer the vehicle 201 along a desired path (e.g., as determined at step S316 in FIG. 4). In response to the request command, the vehicular controller 76 steers the vehicle 201 in accordance with the desired path.

At step S506, the vehicular controller 76 outputs a confirmation message to the implement electronics 10 confirming that the vehicle 201 has been steered according to the received command.

Example embodiments being thus described, the same may be varied in many ways. Such variations are not to be regarded as a departure from the spirit and scope of example embodiments, and all such modifications as would be obvious to one skilled in the art are intended to be included within the scope of the claims.

What is claimed is:

1. An implement comprising:
    a global positioning system receiver configured to obtain position information for the implement;
    a perception detection system configured to capture one or more images of an optical target on a vehicle attached to the implement; and
    an implement control system configured to
        determine a lateral error for the implement based on the position information,
        estimate a lateral error for the vehicle relative to the implement based on (i) the lateral error for the implement, (ii) the one or more images of the optical target on the vehicle, and (iii) steering information associated with the vehicle, the steering information received from a vehicle steering detector on the vehicle and the steering information including at least a wheel angle for the vehicle, and
    steer the vehicle to guide the implement based on at least the lateral error for the implement and the lateral error for the vehicle.

2. The implement of claim 1, wherein the perception detection system includes one or more cameras.

3. The implement of claim 1, wherein the implement control system is configured to
  determine a current angle of the vehicle relative to a longitudinal axis of the implement at a control point of the vehicle based on the one or more images of the optical target,
  estimate a subsequent angle of the vehicle relative to the longitudinal axis of the implement at the control point based on the current angle and the steering information associated with the vehicle, and
  estimate the lateral error for the vehicle relative to the implement based on the subsequent angle of the vehicle and the lateral error for the implement.

4. The implement of claim 3, wherein the steering information associated with the vehicle includes a wheel angle history and a yaw rate for the vehicle.

5. The implement of claim 1, wherein the implement control system is configured to
  project a desired path for the vehicle; and
  steer the vehicle based on the desired path for the vehicle.

6. The implement of claim 5, wherein the implement control system is configured to steer the vehicle by outputting a request command to a vehicular controller at the vehicle, the request command requesting steering of the vehicle along the desired path.

7. A method for controlling a vehicle and implement combination, the method comprising:
  obtaining, by a global positioning system receiver at the implement, position information for the implement;
  capturing one or more images of an optical target on the vehicle;
  determining a lateral error for the implement based on the position information;
  estimating a lateral error for the vehicle relative to the implement based on (i) the lateral error for the implement, (ii) the one or more images of the optical target on the vehicle, and (iii) steering information associated with the vehicle, the steering information received from a vehicle steering detector on the vehicle and the steering information including at least a wheel angle for the vehicle; and
  steering the vehicle to guide the implement based on at least the lateral error for the implement and the lateral error for the vehicle.

8. The method of claim 7, wherein the estimating comprises:
  determining a current angle of the vehicle relative to a longitudinal axis of the implement at a control point of the vehicle based on the one or more images of the optical target;
  estimating a subsequent angle of the vehicle relative to the longitudinal axis of the implement at the control point based on the current angle and the steering information associated with the vehicle; and
  estimating the lateral error for the vehicle relative to the implement based on the subsequent angle of the vehicle and the lateral error for the implement.

9. The method of claim 8, wherein the steering information associated with the vehicle includes a wheel angle history and a yaw rate for the vehicle.

10. The method of claim 7, further comprising:
  projecting a desired path for the vehicle; and wherein
  the steering steers the vehicle based on the desired path for the vehicle.

11. The method of claim 10, further comprising:
  outputting a request command to a vehicular controller at the vehicle, the request command requesting steering of the vehicle along the desired path.

12. A non-transitory computer-readable storage medium storing computer readable instructions that, when executed by one or more processors at an implement, cause the implement to perform a method for controlling a vehicle and implement combination, the method comprising:
  obtaining, by a global positioning system receiver at the implement, position information for the implement;
  capturing one or more images of an optical target on the vehicle;
  determining a lateral error for the implement based on the position information;
  estimating a lateral error for the vehicle relative to the implement based on (i) the lateral error for the implement, (ii) the one or more images of the optical target on the vehicle, and (iii) steering information associated with the vehicle, the steering information received from a vehicle steering detector on the vehicle and the steering information including at least a wheel angle for the vehicle; and
  steering the vehicle to guide the implement based on at least the lateral error for the implement and the lateral error for the vehicle.

13. The non-transitory computer-readable storage medium of claim 12, wherein the estimating comprises:
  determining a current angle of the vehicle relative to a longitudinal axis of the implement at a control point of the vehicle based on the one or more images of the optical target;
  estimating a subsequent angle of the vehicle relative to the longitudinal axis of the implement at the control point based on the current angle and the steering information associated with the vehicle; and
  estimating the lateral error for the vehicle relative to the implement based on the subsequent angle of the vehicle and the lateral error for the implement.

14. The non-transitory computer-readable storage medium of claim 13, wherein the steering information associated with the vehicle includes a wheel angle history and a yaw rate for the vehicle.

15. The non-transitory computer-readable storage medium of claim 12, wherein the method further comprises:
  projecting a desired path for the vehicle; and wherein
  the steering steers the vehicle based on the desired path for the vehicle.

16. The non-transitory computer-readable storage medium of claim 15, wherein the method further comprises:
  outputting a request command to a vehicular controller at the vehicle, the request command requesting steering of the vehicle along the desired path.

17. The implement of claim 1, wherein the implement control system is configured to estimate the lateral error for the vehicle relative to the implement without use of location information from a location determining receiver or a global positioning receiver on the vehicle.

* * * * *